(12) United States Patent
Cleaves

(10) Patent No.: US 9,174,803 B2
(45) Date of Patent: Nov. 3, 2015

(54) COMPACT CONVEYOR SYSTEM

(71) Applicant: John Edward Cleaves, Harriman, TN (US)

(72) Inventor: John Edward Cleaves, Harriman, TN (US)

(*) Notice: Subject to any disclaimer, the term of this patent is extended or adjusted under 35 U.S.C. 154(b) by 0 days.

(21) Appl. No.: 14/191,663

(22) Filed: Feb. 27, 2014

(65) Prior Publication Data

US 2014/0251767 A1 Sep. 11, 2014

Related U.S. Application Data

(60) Provisional application No. 61/773,881, filed on Mar. 7, 2013.

(51) Int. Cl.
| | |
|---|---|
| *B65G 17/06* | (2006.01) |
| *B65G 17/38* | (2006.01) |
| *B65G 17/22* | (2006.01) |
| *A47F 10/06* | (2006.01) |

(52) U.S. Cl.
CPC .............. *B65G 17/068* (2013.01); *B65G 17/06* (2013.01); *B65G 17/065* (2013.01); *B65G 17/066* (2013.01); *B65G 17/067* (2013.01); *B65G 17/22* (2013.01); *B65G 17/38* (2013.01); *A47F 10/06* (2013.01)

(58) Field of Classification Search
CPC .... B65G 17/066; B65G 17/06; B65G 17/065; B65G 17/067; B65G 17/068; B65G 17/38
USPC .................................................. 198/850, 851
See application file for complete search history.

(56) References Cited

U.S. PATENT DOCUMENTS

| | | | |
|---|---|---|---|
| 1,757,652 A | 5/1930 | Bethke | |
| 1,800,663 A | 4/1931 | Schade | |
| 3,317,030 A | 5/1967 | Davis | |
| 3,379,300 A * | 4/1968 | Karr | 198/833 |
| 3,399,758 A | 9/1968 | Karr | |
| 3,554,360 A * | 1/1971 | Bildsoe | 198/833 |
| 3,595,377 A | 7/1971 | McCoy | |
| 3,685,637 A | 8/1972 | Bildsoe | |
| 3,738,478 A | 6/1973 | Tourtellotte | |
| 3,807,548 A * | 4/1974 | Bergeron | 198/850 |
| 4,130,195 A | 12/1978 | Becker | |
| 4,216,845 A | 8/1980 | Tashman | |
| 4,349,086 A | 9/1982 | Yamada | |
| 4,476,974 A * | 10/1984 | Bradbury | 198/832 |
| 4,609,092 A | 9/1986 | Takai | |
| 4,765,440 A | 8/1988 | Tashman | |
| 4,840,253 A | 6/1989 | DiMaggio | |
| 4,977,823 A | 12/1990 | Kuwahara | |
| 5,042,648 A * | 8/1991 | Garvey | 198/853 |
| 5,394,978 A * | 3/1995 | Majewski et al. | 198/833 |

(Continued)

*Primary Examiner* — Leslie A Nicholson, III

(57) ABSTRACT

A conveyor system including a train of carrier plates arranged for movement along a conveyor path which possesses either rightward turns or leftward turns and each carrier plate defines a leading edge and a trailing edge. Each of the leading and trailing edges has an outer portion which is disposed adjacent a side of the carrier plate opposite the direction of turn of the conveyor path and an inner portion. Each carrier plate is pivotally mounted upon an endless drive member at a location along the carrier plate which is disposed between the leading and trailing edges of the plate, and is shaped so that the outer portion of each of its leading and trailing edges is longer than the inner portion of its leading and trailing edges. Gap plates cover any gap between two sequential conveyor plates as the train is moved through non-linear sections of the conveyor path.

19 Claims, 15 Drawing Sheets

(56) References Cited

U.S. PATENT DOCUMENTS

| | | |
|---|---|---|
| 5,477,778 A | 12/1995 | Kuwahara |
| 5,562,183 A | 10/1996 | Naramura |
| 5,799,779 A | 9/1998 | Konitzer |
| 6,170,643 B1 | 1/2001 | Shah |
| 6,431,318 B1 | 8/2002 | Tanaka |
| 6,554,106 B1 | 4/2003 | Tokimoto |
| 6,662,545 B1* | 12/2003 | Yoshida .......................... 59/78 |
| 6,935,489 B2* | 8/2005 | Kawasaki .................. 198/840 |
| 6,981,584 B2* | 1/2006 | Grabmann .................. 198/853 |
| 7,775,346 B1 | 8/2010 | Taylor |
| 7,810,427 B2 | 10/2010 | Ishino |
| 8,191,704 B2 | 6/2012 | Ishino |
| 2001/0043857 A1 | 11/2001 | Tokuno |
| 2004/0124070 A1* | 7/2004 | Okoshi ........................ 198/850 |
| 2008/0179169 A1 | 7/2008 | Ishino |
| 2010/0012435 A1 | 1/2010 | Ishikawa |
| 2010/0140057 A1 | 6/2010 | Ishino |
| 2010/0270123 A1 | 10/2010 | Ishino |
| 2011/0108388 A1* | 5/2011 | Van Den Goor et al. 198/370.02 |
| 2011/0247923 A1* | 10/2011 | Andreoli et al. .............. 198/851 |
| 2012/0012441 A1 | 1/2012 | Ishino |
| 2012/0031741 A1 | 2/2012 | Ishino |
| 2012/0181151 A1 | 7/2012 | Ishino |
| 2012/0186948 A1 | 7/2012 | Ishino |
| 2012/0186950 A1 | 7/2012 | Ishino |
| 2013/0037390 A1 | 2/2013 | Laniado |

* cited by examiner

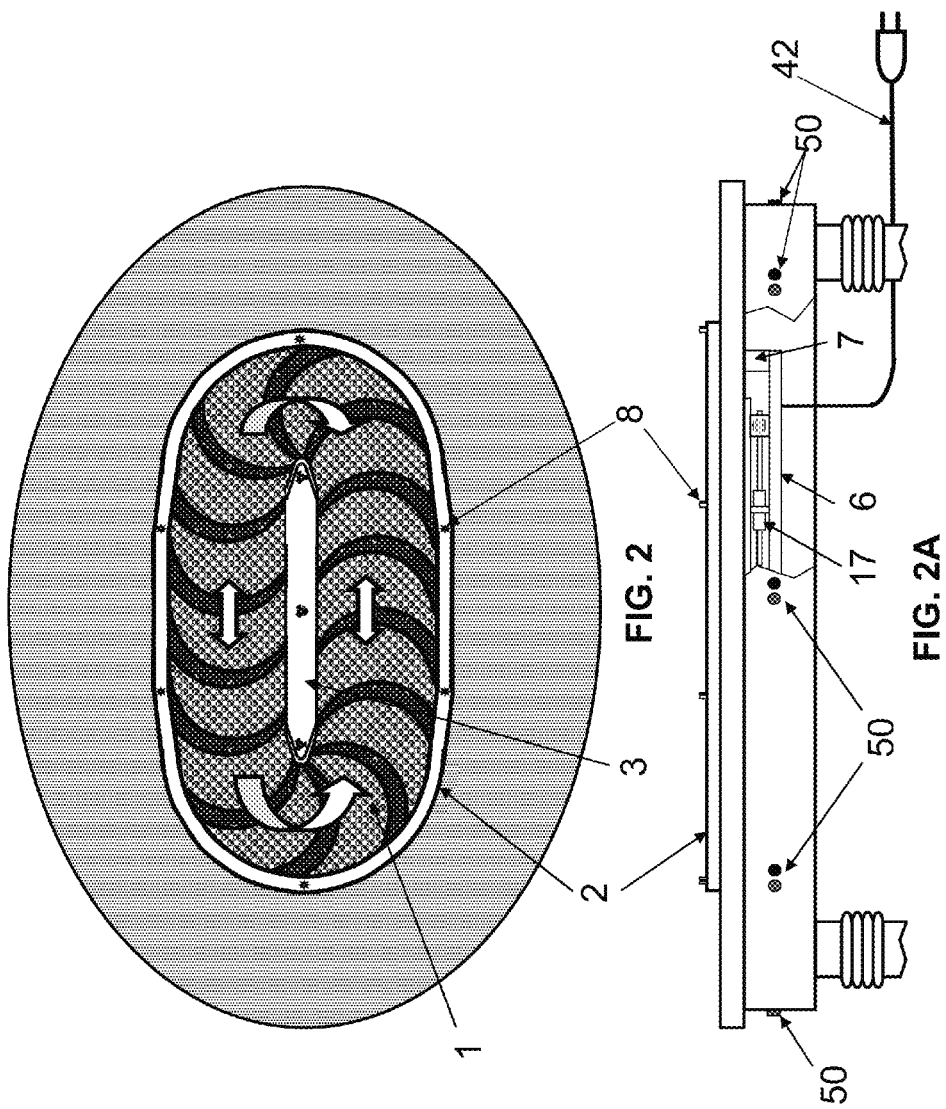

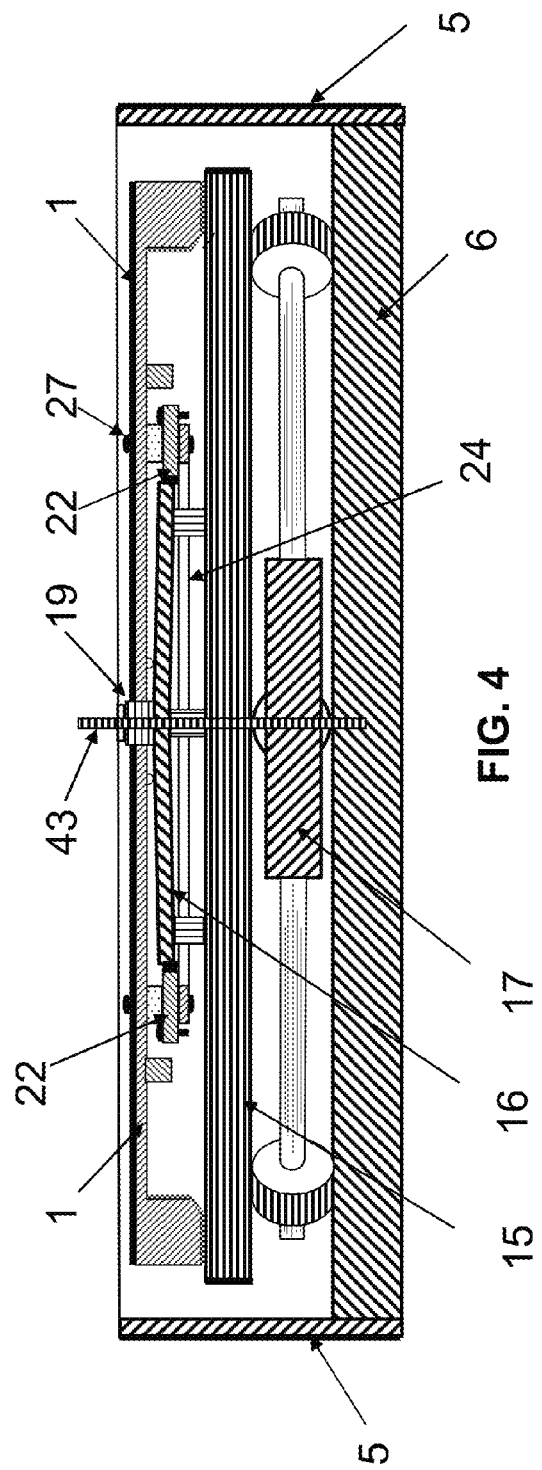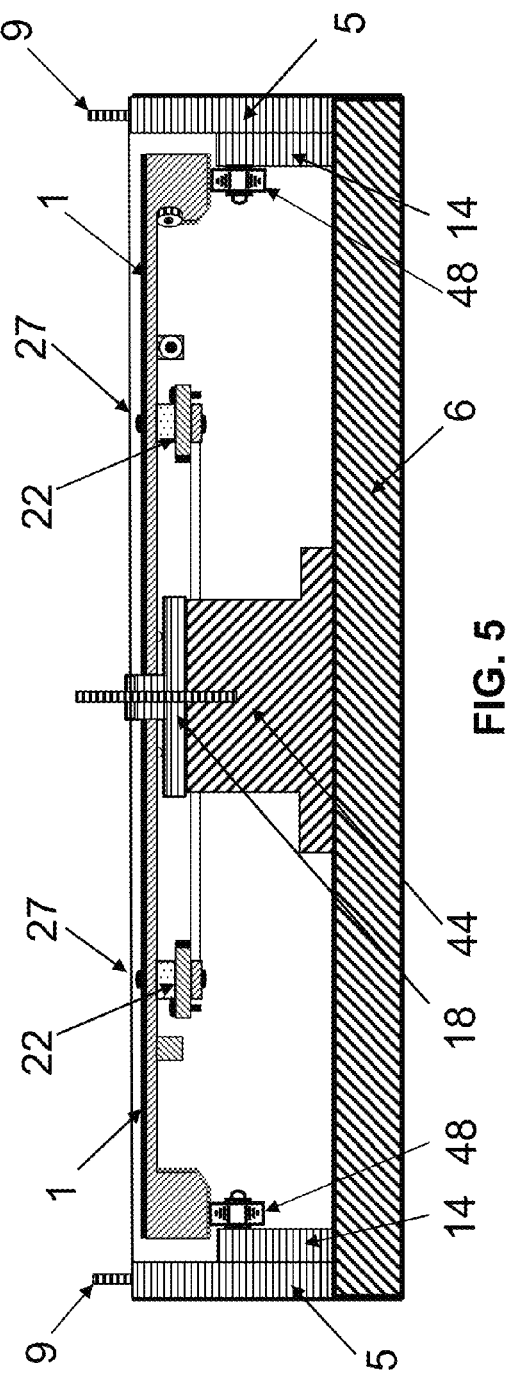

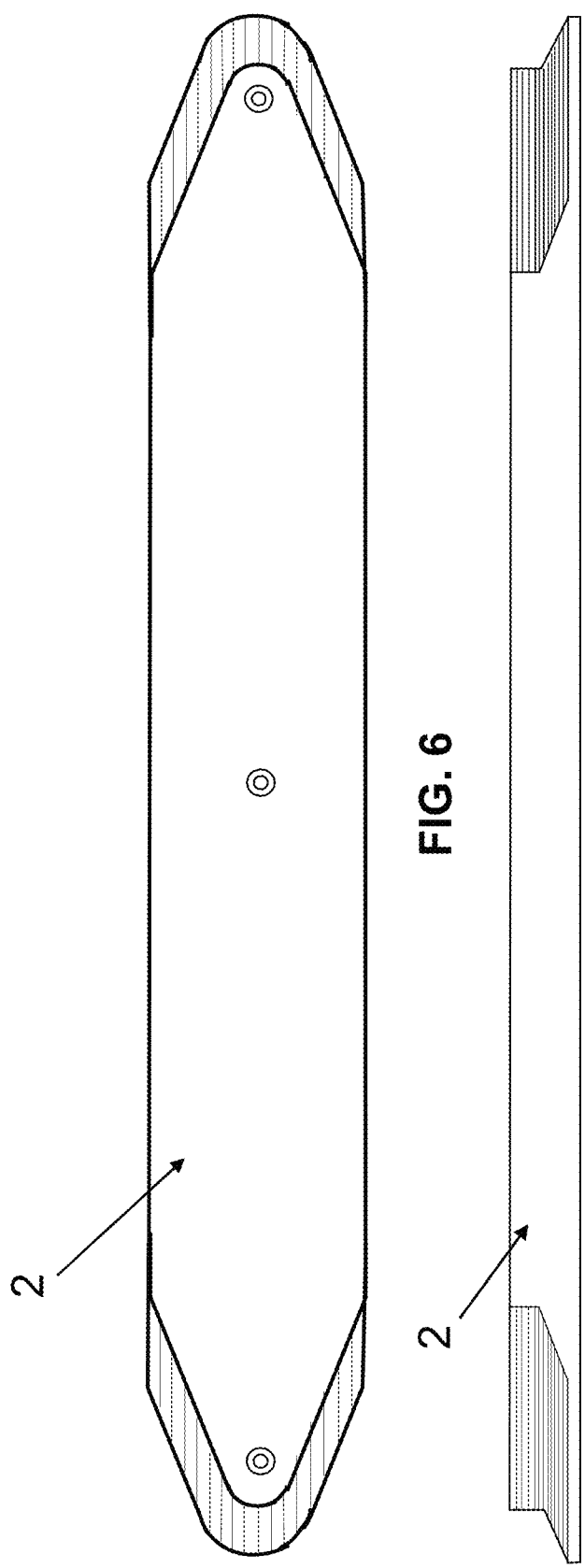

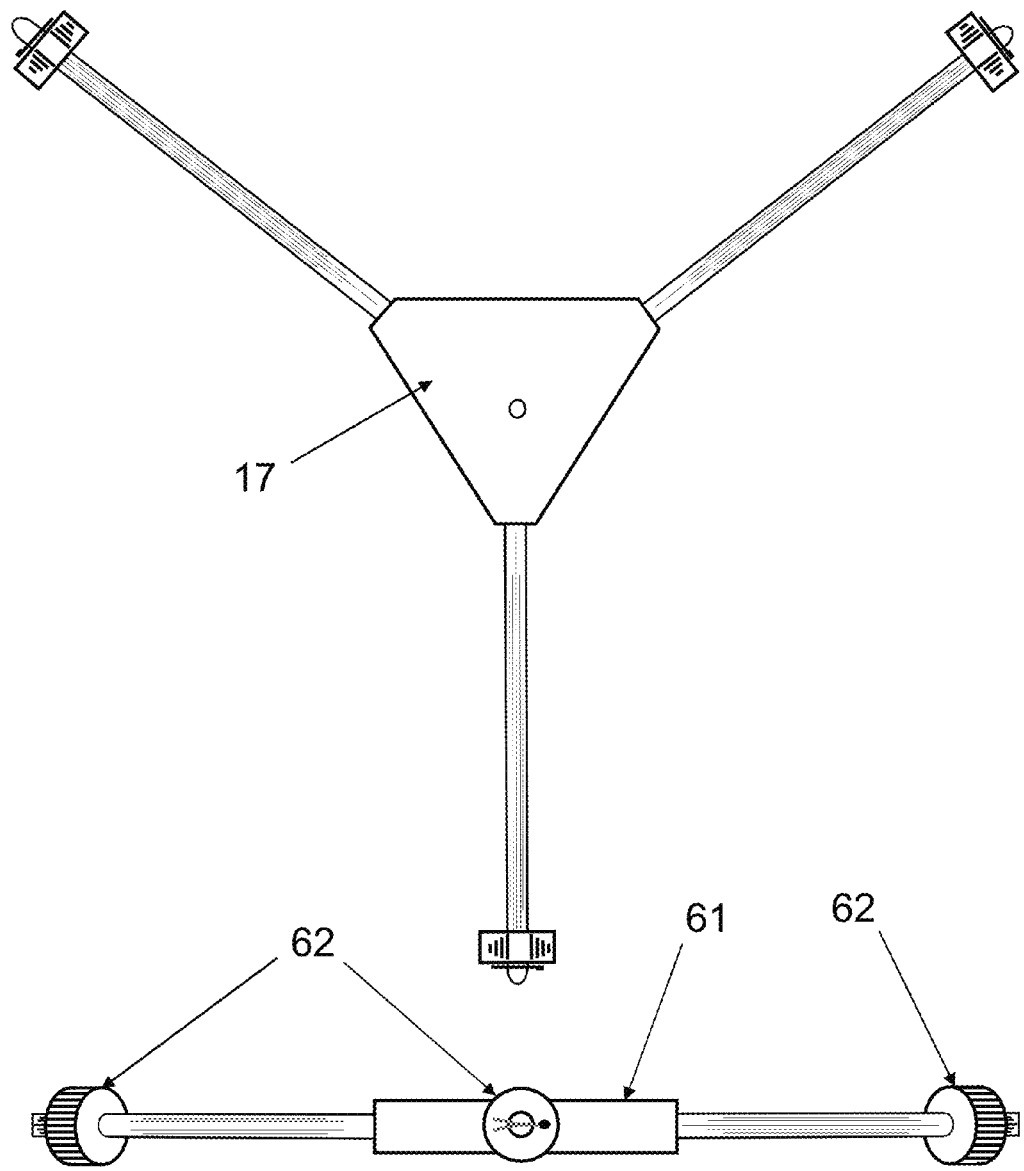

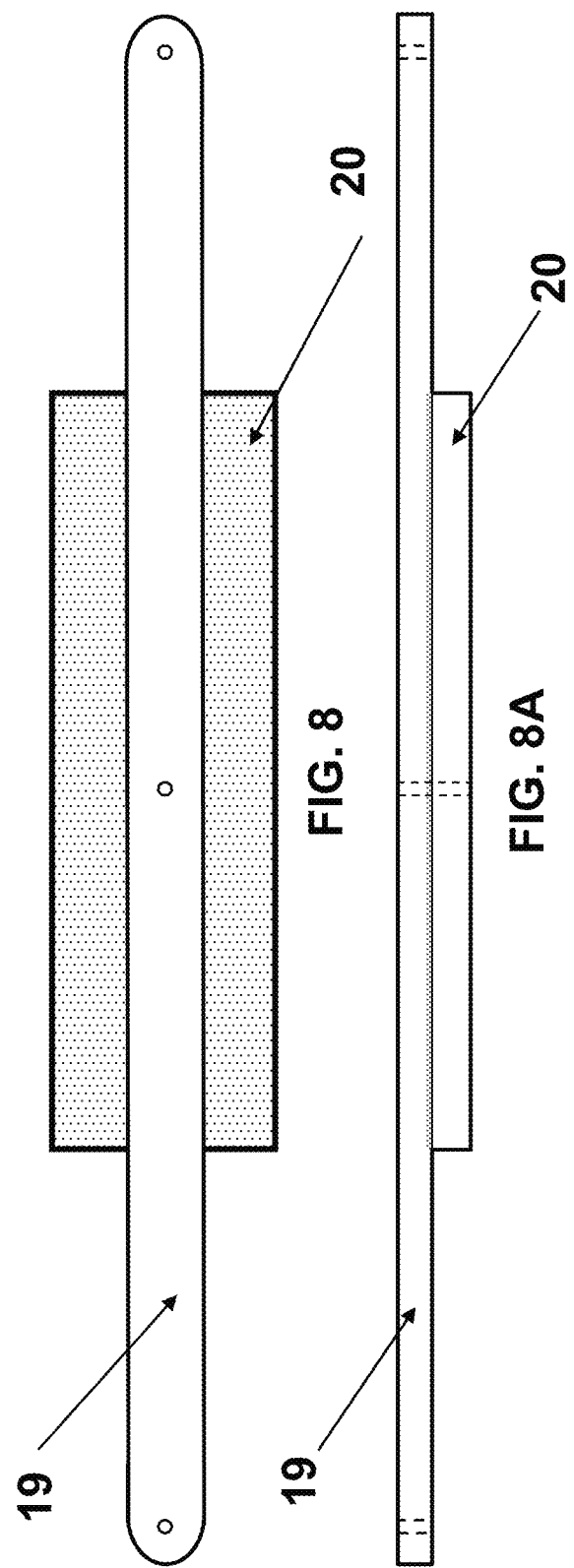

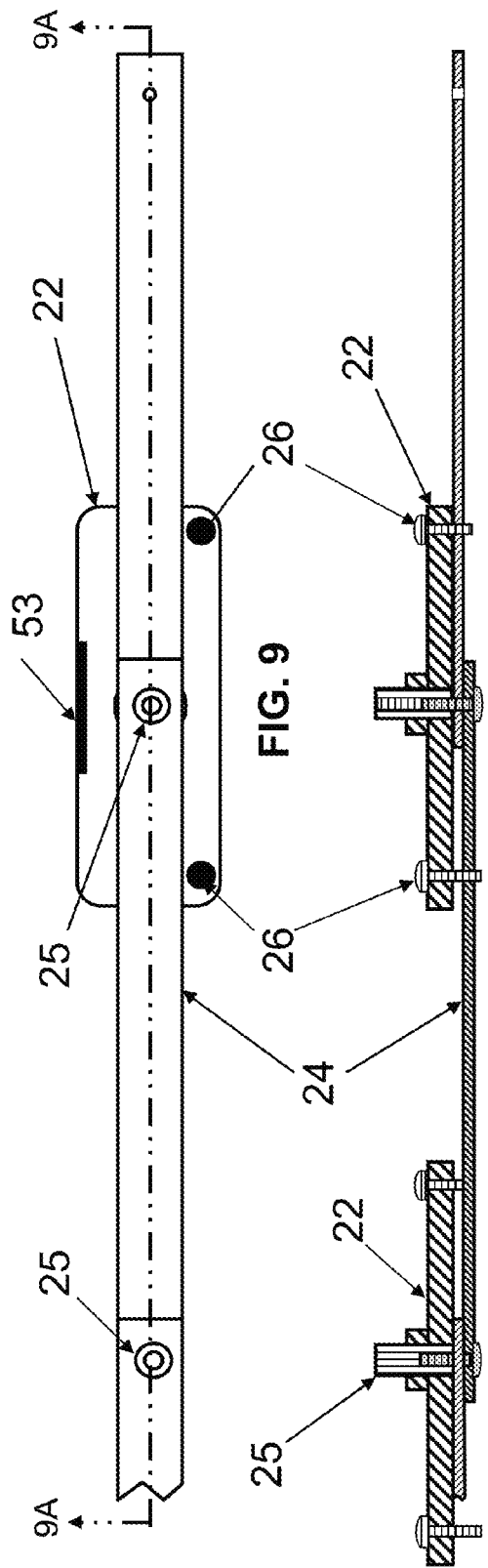
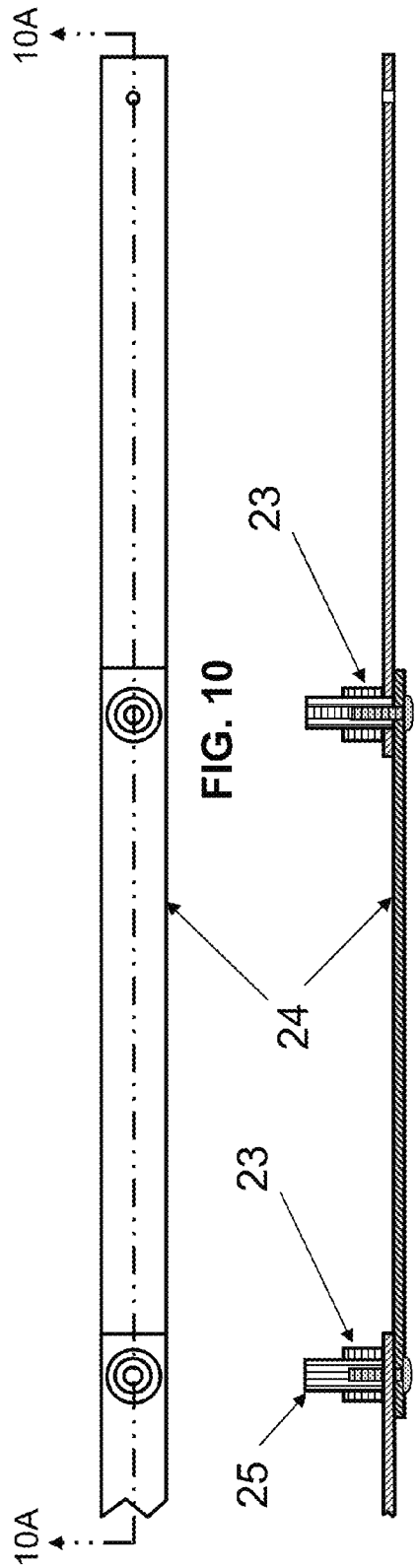

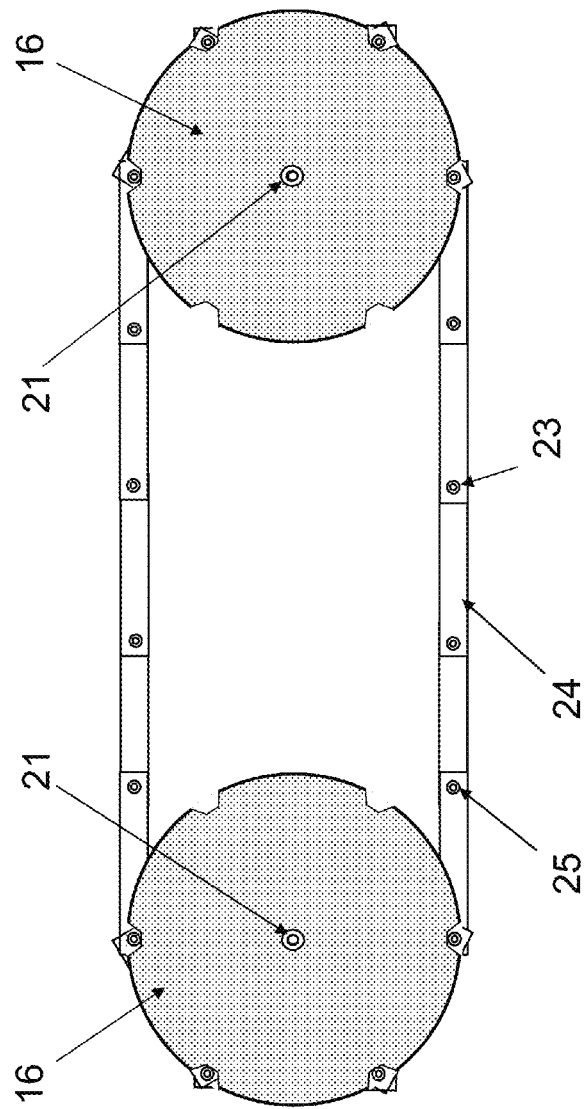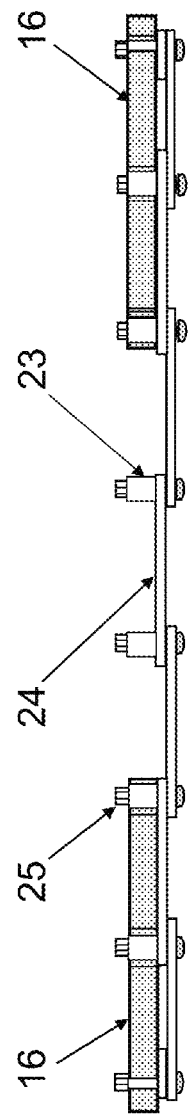
FIG. 11
FIG. 11A

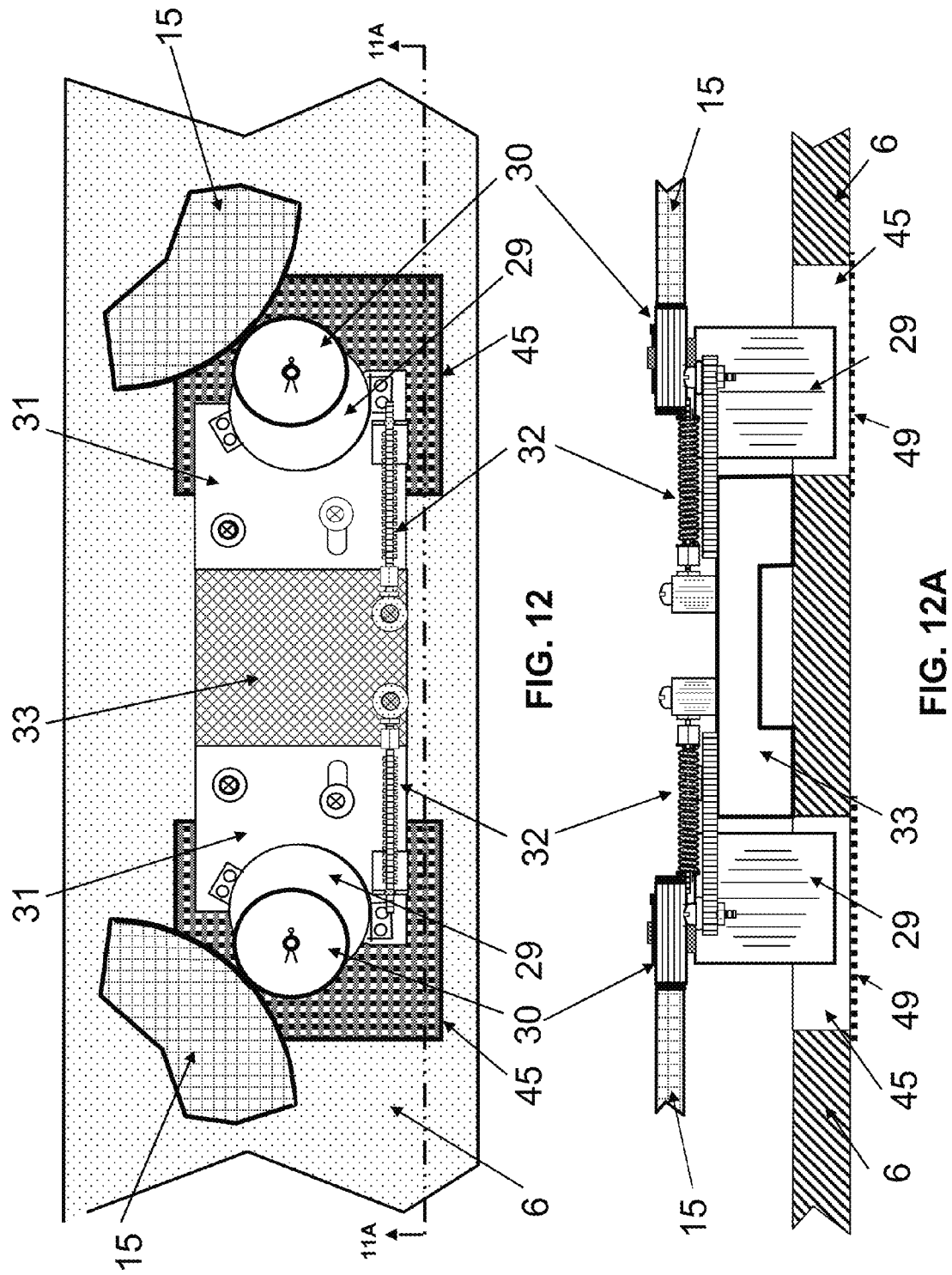

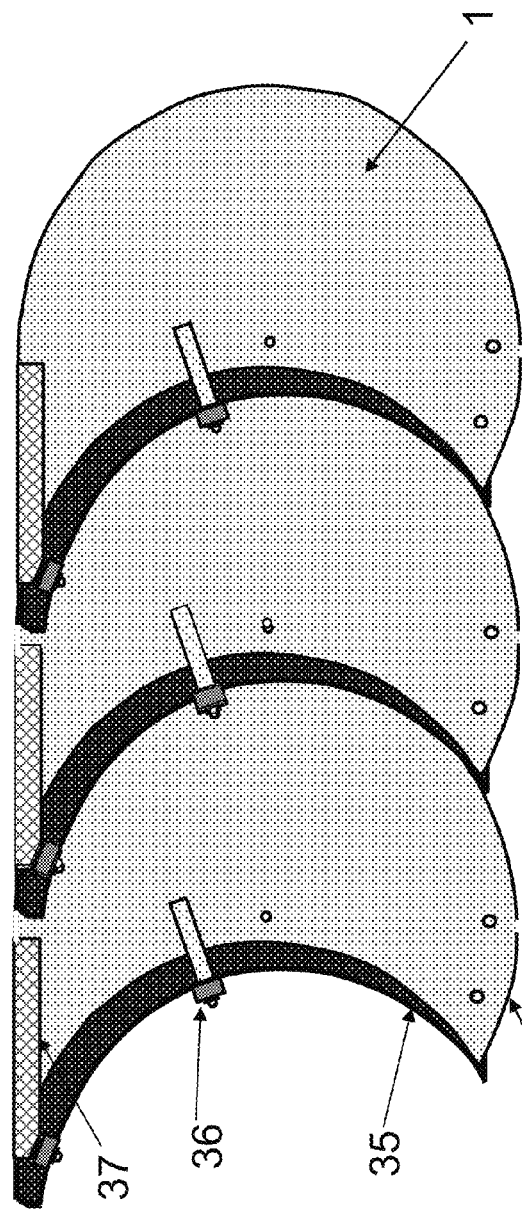
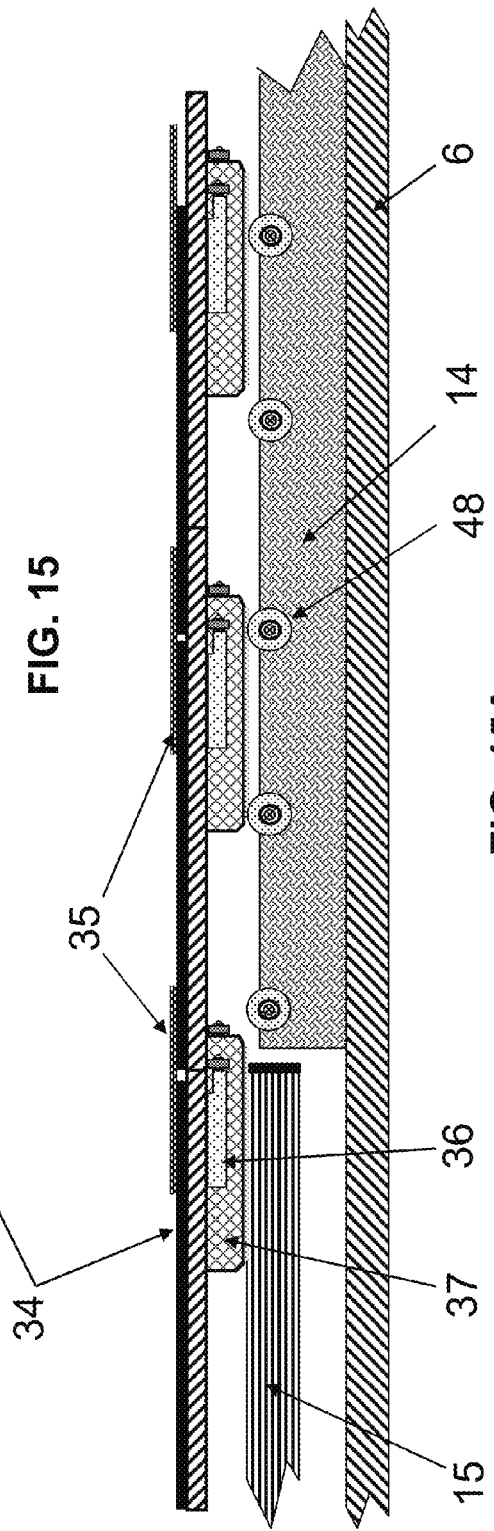
FIG. 15
FIG. 15A

COMPACT CONVEYOR SYSTEM

CROSS-REFERENCE TO RELATED APPLICATIONS

The benefit of Provisional Application Ser. No. 61/773,881, filed Mar. 7, 2013 by the present inventor is hereby claimed. The disclosure of this referenced provisional patent application is incorporated herein by reference.

BACKGROUND OF THE INVENTION

The device pertains to conveyors and more particularly those used in confined spaces such as dining tables or work benches.

Numerous re-circulating conveyors have been designed and used in the past to move articles. Most of these have used belts, storage bins, individual bowls, trays, or other carrier devices that restrict the size and shape of the articles being carried. Re-circulating conveyors usually involve large turning radii that tend to have a large unused space at the center, and/or carrier device shapes that do not maximize the surface area presented to articles being carried. In nearly all cases the gap between carrier devices must change as they traverse the conveyor path. Further, most are large and bulky and/or use multiple belts or other surfaces that allow small parts to be dropped while transferring loads from one conveyor section to another. Few provide a low friction means to support loads through the conveyor 180 degree turn-around sections, nor a means to reduce friction and provide smooth transition between conveyor sections by distributing load among several carrier devices. Very few include control circuits to prevent conflicting motion commands, chain or belt tensioning devices to compensate for dimension changes due to manufacturing tolerances, and/or clutch mechanisms that provide smooth starting. Also, many of these inventions are noisy and not of compatible décor for use in home or commercial dining applications.

U.S. Pat. No. 5,042,648 to Garvey presents a conveyor in a crescent chain configuration. Its drive chain must follow the same path as the center of the crescent shaped, load carrying plate. This arrangement will cause gap between plates to be larger in conveyor straight sections than in the non-linear sections. Without a mechanism to accommodate this changing gap, binding will occur at sharp turn sections. Further, its support mechanism is a U-shaped flange traveling in a horseshoe shaped track in the straight sections. This will support travel in the clockwise direction, but in the counter clockwise direction the flange may bind or hang-up where the flange enters the track. The horse-shoe shaped track appears bulky, difficult to fabricate, and does not leave room for motor drive equipment to be mounted in a low height, small footprint housing. It is not obvious how load is supported in the turn-around sections, nor how load is smoothly transferred from the straight sections to the turn-around sections an vice-versa. Also no mechanism for motor drive equipment or equipment to maintain proper tension on the chain is presented.
Suggested Objects are Provided Here:

It would be desirable to provide a new and improved conveyor system which circumvents the limitations associated with the conveyor systems of the prior art.

Accordingly, it is an object of the present invention to provide a new and improved conveyor system which is well-suited for use in relatively small spaces, such as on a dining room table or upon a work bench.

Another object of the present invention is to provide such a system having a support surface which is adapted to move along a desired conveyor path and which is substantially continuous (i.e. gap-free) as a path is traced along the conveyor path.

Still another object of the present invention is to provide such a system wherein the support surface is adapted to move through a turn of relatively small radius.

Yet another object of the present invention is to provide such a system wherein the support surface is provided by a train, or series, of carrier plates wherein each plate has a shape which cooperates with that of an adjacent plate in the train to reduce the likelihood of the creation of a sizable gap between any two sequential carrier plates in the train as the trains of plates move along the conveyor path.

A further object of the present invention is to provide such a conveyor system which includes gap plate attachments to its carrier plates which cover any gaps which may be present between two sequential carrier plates in the train as the train of carrier plates are moved either leftward or rightward turns along the conveyor path.

A still further object of the present invention is to provide such a conveyor system which includes inner and outer rails that guide objects of any shape around the conveyor path.

Another object of the present invention is to provide such a conveyor system which provides start, stop, and direction control from multiple locations Still another object of the present invention is to provide such a conveyor system which provides an interlocking carrier plate configuration that distributes weight among several plates A further object of the present invention is to provide such a conveyor system which is uncomplicated in structure, yet effective in operation, esthetically pleasing, and easily disassembled for maintenance or cleaning A still further object of the present invention is to provide such a conveyor system which can be constructed as a stand alone, portable, table top unit as shown in FIG. 1 or integration into the construction of a table or bench as shown in FIG. 2. and is capable of varying the conveyer width, length, speed and load carrying capacity by changing the size and/or quantity of key components,

SUMMARY OF THE INVENTION

This invention resides in an improvement to a conveyor system having a train of carrier plates which collectively provide a support surface upon which an item to be conveyed can be placed and an endless drive member to which each carrier plate in the train is connected and which defines a conveyor path along which the item to be conveyed is moved by the system. Furthermore, the conveyor path includes either rightward-turning sections or leftward-turning sections, and each carrier plate is pivotally connected to the endless drive member to permit a pivotal adjustment of the carrier plate relative to the endless drive member in either a rightward or leftward direction as the train of carrier places is moved through the rightward-turning or leftward-turning sections of the conveyor path.

The improvement is characterized in that each carrier plate defines a leading edge which is directed substantially forwardly of the conveyor path when the train of carrier plates is moved along the conveyor path, an opposite trailing edge. Furthermore, each of the leading and trailing edges has a outer portion which is disposed adjacent a side of the carrier plate opposite the direction of turn of the rightward-turning or leftward-turning sections of the conveyor path and an inner edge portion which is disposed adjacent a side of the carrier plate corresponding to the direction of turn of the rightwardly-turning or leftwardly-turning sections of the conveyor path. Still further, the leading and trailing edges of each carrier plate is shaped so that the trailing edge of a first of two sequential carrier plates in the train is accepted or received by the leading edge of a second of the two sequential carrier plates in the train. In addition, each carrier plate is shaped so that the outer portion of each of its leading and trailing edges is longer than the inner portion of its leading and trailing edges so that as two sequential conveyor plates in the train are moved through the rightward-turning sections or leftward-turning sections of the conveyor path, the trailing edge of the first plate of the two sequential carrier plates is maintained in relatively close proximity to the leading edge of the second plate of the sequential carrier plates.

BRIEF DESCRIPTION OF THE DRAWINGS

In the drawings, closely related figures have the same number but different alphabetic suffixes.

FIG. 2 is a plan view of the assembled device integrated into the construction of a standard table or bench.

FIG. 2A is an elevation view of the assembled device integrated into the construction of a standard table or bench.

FIG. 4 is a sectional view taken along line 4-4 in FIG. 3.

FIG. 5 is a sectional view taken along line 5-5 in FIG. 3. For clarity, motor subassemblies, turn-around wheel subassemblies, tripod bearing, and pushbutton switches are not shown.

FIG. 6 is a plan view of the inner rail.

FIG. 6A is an elevation view of the inner rail.

FIG. 7 is a plan view of the tripod roller bearing subassembly

FIG. 7A is an elevation view of the tripod roller bearing subassembly.

FIG. 8 is a plan view of the center support subassembly

FIG. 8A is an elevation view of the center support subassembly

FIG. 9 is a plan view of the drive chain subassembly using travelers

FIG. 9A is a sectional view taken along line 9-9 in FIG. 9.

FIG. 10 is a plan view of the expandable drive chain segment using bearing sleeves FIG. 10A is a sectional view taken along line 10-10 in FIG. 10.

FIG. 11 is a plan view of the drive wheel and drive chain segment in the sprocket configuration FIG. 11A is an elevation view of the drive wheel and drive chain segment in the sprocket configuration FIG. 12 is a plan view of the drive motor subassembly FIG. 12A is an elevation view of the drive motor subassembly

FIG. 15 is a plan view showing the interlocking feature of the top plates.

FIG. 15A is an elevation view showing the interlocking feature of the top plates.

Figure 1:
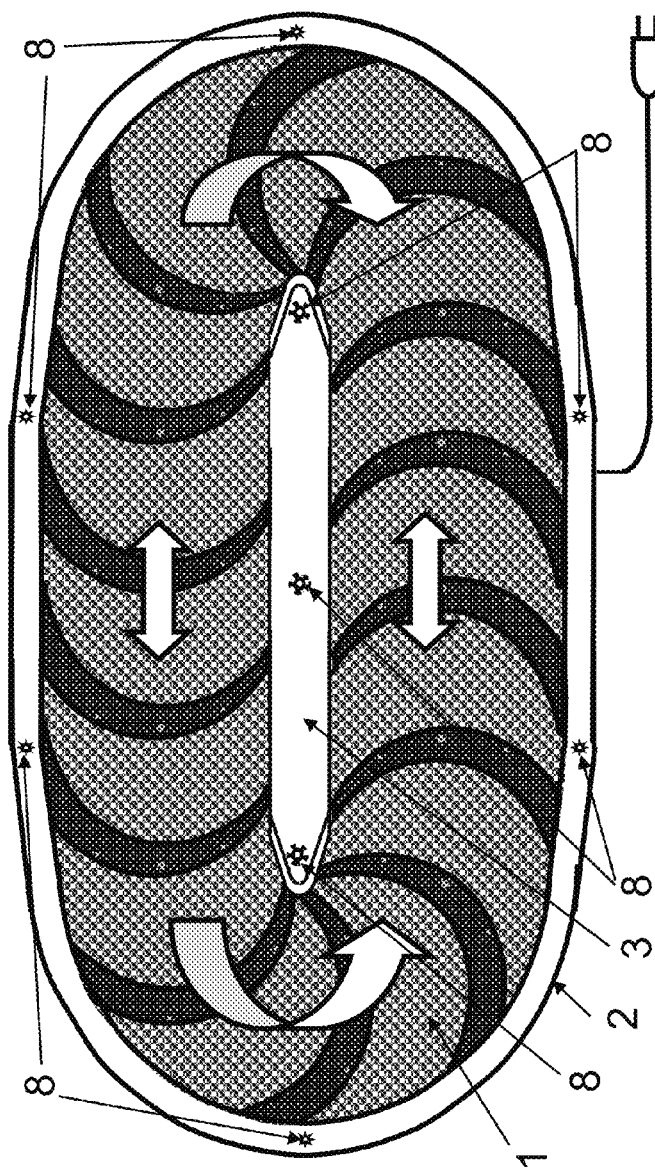
FIG. 1 is a plan view of the assembled device in the table top configuration
Figure 1A:
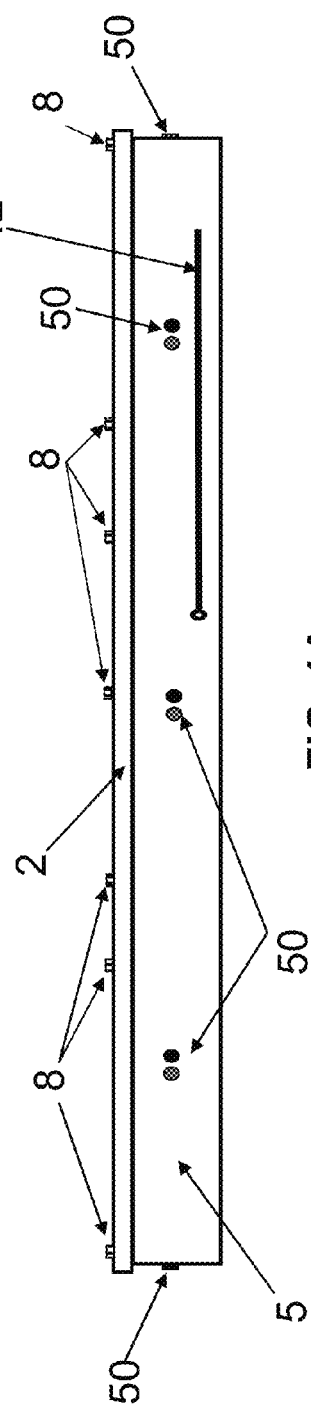
FIG. 1A is an elevation view of the assembled device in the table top configuration

DRAWINGS—REFERENCE NUMERALS 1 carrier plate subassembly
2 outer rail
3 inner rail
4 control switch subassembly
5 side walls
6 base
7 mounting post
8 thumb nut for retaining rails
9 mounting studs for outer rail
10 turn-around wheel subassembly
11 drive chain subassembly
12 motor subassembly
13 center support subassembly
14 roller rail
15 carrier plate support wheel
16 chain drive wheel
17 tripod roller bearing
18 center support subassembly
19 center support rail
20 center support plate
21 shoulder washer in chain drive wheel
22 traveler
23 bearing sleeve on chain drive
24 chain segment
25 attachment stud on chain drive
26 alignment pins on travelers
27 machine screw to attach carrier plate subassembly
28 pushbutton activation slat
29 motor
30 motor drive wheel
31 mounting plate for motor
32 adjustable spring tensioner
33 support table for motor
34 carrier plate
35 gap plate
36 carrier plate center support
37 carrier plate runner or strut
38 low friction pads on carrier plate
39 motor starting capacitors
40 motor control relay subassembly
41 cabling
42 power cord
43 turn-around wheel center posts
44 support block/center post subassembly
45 opening in base for motors
46 power plug
47 mounting bracket for outer rail
48 rollers for roller rail
49 motor covers
50 control switch pushbutton
51 control switch
52 control switch mounting block
53 high friction material on traveler inner edge
54 carrier plate leading edge
55 outer portion of carrier plate leading edge
56 inner portion of carrier plate leading edge
57 carrier plate trailing edge
58 outer portion of carrier plate trailing edge 59 inner portion of carrier plate trailing edge
60 pivot point on carrier plate
61 armature for tripod roller bearing
62 rollers on tripod roller bearing

DETAILED DESCRIPTION OF AN ILLUSTRATIVE EMBODIMENT

The apparatus is a compact, re-circulating, crescent chain conveyer in an oval configuration. As shown in FIG. 1, it provides a continuous load supporting, horizontal surface that can be moved in either a clockwise or counter-clock wise direction and controlled from multiple locations. The continuous surface is formed of asymmetrical, crescent shaped, interlocking, carrier plate assemblies 1 that maximize the load carrying surface and enable the device footprint to be small enough to be used on normal size dining table or bench. In addition, the conveyer width and length can be varied by changing the size and/or quantity of key components. Dining plates, bowls, parts containers, trays, or other objects are constrained to the moving continuous surface by a inner rail 3 and outer rail 2. Start, stop, and direction of the surface motion are provided by control switch subassemblies 4.

In one embodiment, all motor and drive components to be hidden under the load carrying surface. This provides a small height, stand alone, portable table top unit as shown in FIG. 1. In other embodiments it is integrated into the construction of a table or bench as shown in FIG. 2. In the FIG. 1 embodiment, the outer rail 2 rests on the side walls 5. When the device is integrated into table construction, the side walls 5 are not used. Instead the drive mechanism components are mounted under the table and either a flat outer rail is mounted directly on the table top or the carrier plates are mounted slightly lower than the table top such it provides the outer rail function. A base 6 is mounted under the table top using mounting posts 7, and the control switch subassemblies 4 are mounted at the outer edge of the table.

The inner and outer rails guide objects around the conveyor path. They are shaped so that the rails cover both the inner and outer edges of the carrier plate subassembly and maximize the size of the load being carried. Inner rail construction is shown in FIG. 6. The beveled edge on the lower portion of the inner rail ends allows loads with a curved bottom (such as plates or serving platters) to ride above the bevel while they traverse the turn-around portion of the conveyor path. The rails can be fabricated from wood, molded plastic or other suitable materials and are attached with mounting studs 9 and thumb nuts 8 or other mechanical connection devices that can be easily removed without tools. In embodiments where guiding articles is not needed, the rails can be eliminated.

Figure 3:
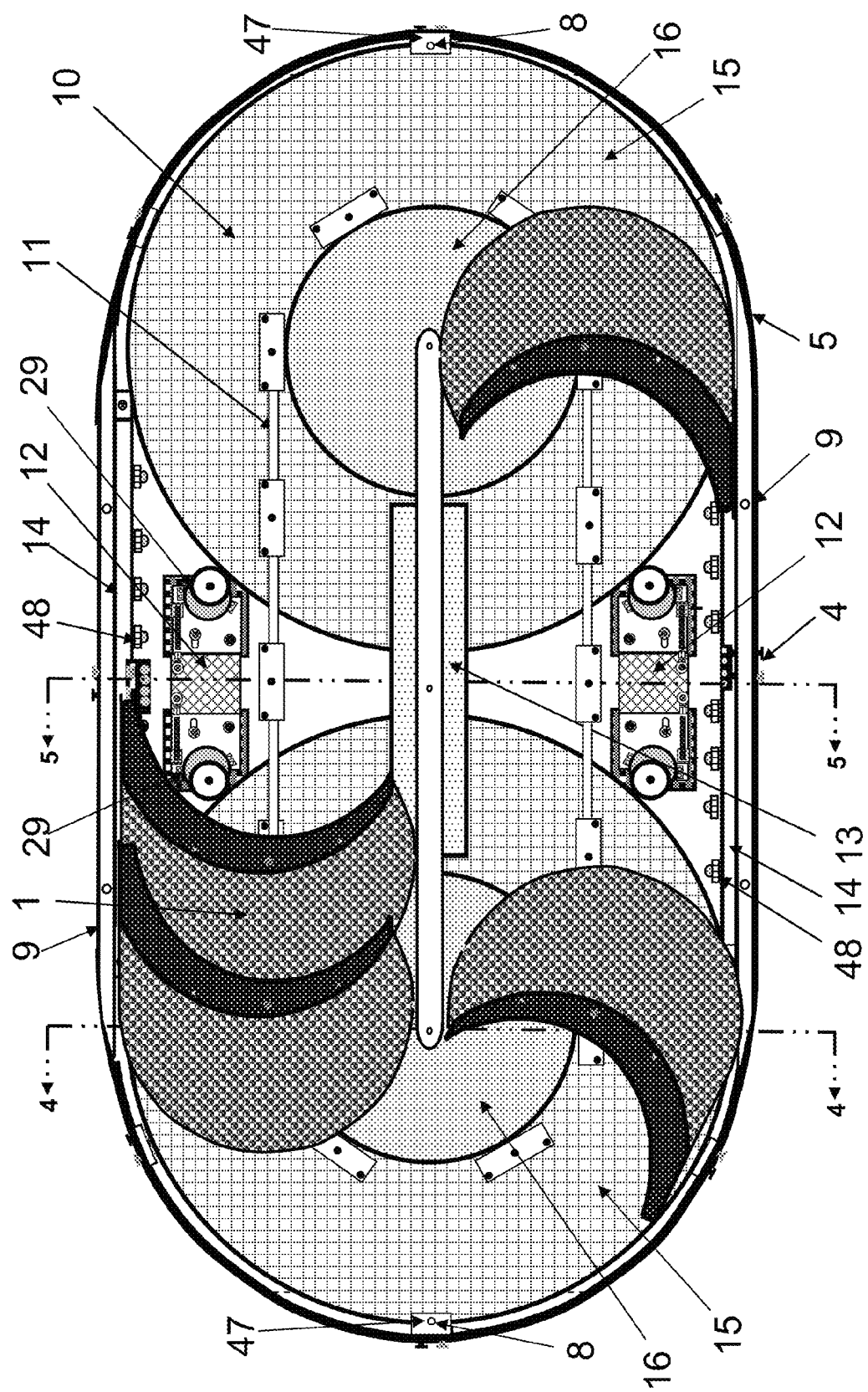
FIG. 3 is a plan view of the device with the inner rail, outer rail, and several top plate assemblies removed.

As shown in FIG. 3, removing the rails and a few of the carrier plate assemblies, reveals the carrier plate subassembly 1, drive chain subassembly 11, the control switch subassemblies 4, the side walls 5, and the crescent chain support and drive mechanism.

The carrier plate subassembly 1 has an asymmetrical crescent geometry. The crescent shape on the inner edge allows the plate to traverse a small turning radius at each circular end of the conveyor path. This results in a small conveyor overall width. The straight outer edge maximizes the surface presented to loads at the outer edge of the conveyor surface. The plate assemblies are connected to the drive chain subassembly 11 in a way that allows them to pivot as they traverse the circular ends of the conveyor path.

In the straight section of the conveyor path, side walls are sufficiently thick to provide stiffness to the base and a supporting surface for the outer rail 2. In the curved portion, walls are sufficiently flexible to provide the curved surface but sturdy enough to support the outer rail. Outer rail mounting brackets 47 are provided in the curved sections. The walls are provided with an aesthetically pleasing scratch resistant surface. Control switch subassemblies 4 are mounted in the side walls 5.

The carrier plate subassembly support and drive mechanism consists of a turn-around wheel subassembly 10, the drive chain subassembly 11, a motor subassembly 12, a center support subassembly 13, and a roller rail 14.

The turn-around wheel subassembly 10 consists of a carrier plate support wheel 15 and a chain drive wheel 16 which is positioned above the support wheel as shown in FIG. 4. The chain drive wheel has a low friction material on its top surface to aid carrier plates in traversing across it. The chain drive wheel is raised above the carrier plate support wheel so that drive chain segments 24 can pass under it. This is necessary because the path length of straight chain segments is shorter than the path along the perimeter of the chain drive wheel. Without a mechanism to accommodate this changing gap, binding will occur at sharp turn sections. Note in FIG. 3 that the chain is not visible as it passes around the drive wheels.

In one embodiment, the support wheels 15 are supported by tripod roller bearing subassemblies 17 that provide rotary motion while under load as shown in FIG. 4. Roller bearing subassembly construction is shown in FIG. 7. The subassembly consists of rigid armature 61 and rollers 62 that support the support wheels at three points. The rollers are positioned along a circle that is concentric with the support wheel and at a radius large enough to provide stable support. The roller diameter is chosen to make the carrier plate support wheel height the same as the motor drive wheel height. Rollers ride on the base 6. The rollers have a soft rubber outer surface to provide quiet operation. In other embodiments, such as applications requiring low height above the base or heavy loads, the tripod roller bearing is replaced by Lazy Susan type bearings setting on mounting blocks. The mounting block height is chosen to make the carrier plate support wheel height the same as the motor drive wheel height. Also shown in FIG. 4, the turn around wheel subassemblies and tripod bearings are restrained horizontally by turn-around wheel center posts 43.

The center support subassembly 13 is shown in FIG. 8 and consists of a center support rail 19 and a center support plate 20.

On the curved portion of the conveyor path, carrier plates are supported by carrier plate support wheel 15 on the outer edge and the chain drive wheel 16 on the inner edge. They are constrained to the conveyor path by tension in the drive chain subassembly 11. In the straight portion of the conveyor path, carrier plates are supported by a roller rail 14 on the outer edge and the center support plate 20 on the inner edge. They are restrained to the conveyor path by the center support rail 19 and the side walls 5. See FIG. 5. (For clarity, motor subassemblies, turn-around wheel subassemblies, tripod bearing, and pushbutton switches are not shown.) The center support plate 20 and the upper portion of the side wall 5 in the straight section are covered with a low friction material to assist motion.

The roller rail 14 consists of a stiff rail with rollers as shown in FIG. 5. Rollers 48 can be purchased or easily fabricated from nylon spacers. The rail can be fabricated from wood, plastic, aluminum bar, or other rigid material. It is attached to the base such that if needed, shims can be placed under it to make the roller height the same as the plate support wheel height.

The drive chain subassembly 11 consists of attachment studs 25 connected to chain segments 24 as shown in FIG. 9 and FIG. 10. In one embodiment, travelers 22 slide over the attachment studs such that they can pivot with respect to the chain segments. The travelers have a high friction material on the inner edge 53 where they contact the edge of the chain drive wheel 16. Travelers have alignment pins 26 that insure the travelers will remain in a position that will properly engage the chain drive wheel. Travelers can be fabricated from plastic or aluminum sheet or be molded as a single unit. In another embodiment, the chain drive wheel 16 has trapezoidal shaped slots to form a sprocket. In lieu of a traveler, a bearing sleeve 23 slides over the attachment stud. The sleeve passes through the slot in the sprocket to the carrier plate subassembly. This is shown in FIG. 11. The embodiment using travelers is readily made and will provide proper operation for all conveyor sizes. The embodiment using a sprocket may be more appropriate for heavy loads.

As shown in FIG. 5; in one embodiment, a machine screw 27 is used to attach the carrier plate assemblies 1 to the attachment studs 25 on the drive chain subassembly 11. This provides a stable joint that allows the traveler or bearing sleeve to pivot with respect to the carrier plate as the plate and traveler traverse the conveyor path. This arrangement enables installing the chain subassembly first, then the travelers or bearing sleeves, and then the carrier plate assemblies 1. Other embodiments use other mechanical connection devices that allow the carrier plate, traveler, bearing sleeve, and chain segments to pivot with respect to each other.

In one embodiment, the chain segments 24 are rigid slats of aluminum or plastic. In other embodiments, flexible chain segments are made of ball, roller, flat link or other types of chain with numerous links.

The motor subassembly 12 consists of a motor 29, motor drive wheel 30, mounting plate 31, and an adjustable spring tensioner 32 installed on a support table 33 as shown in FIG. 12.

Motors 29 are bi-directional and equipped with a clutch on the drive shaft that slips when the motor has reached its rated torque capacity. In some embodiments, four motors are provided to drive the carrier plate support wheels 15. However, applications with lighter loads need fewer motors; thus in other embodiments, one, two, or three motors are used.

In one embodiment, motor drive wheels 30 have a high friction surface that is pressed against the carrier plate support wheel 15 by the spring tensioner 32. The carrier plate support wheels 15 also have a high friction surface on edge contacting the motor drive wheel 30. In other embodiments, the motor drive wheel has gear teeth that engage gear teeth in the plate support wheel. Tensioners 32 are adjusted so that the motor drive wheel 30 engages the carrier plate support wheel 15 without slipping.

Manufacturing tolerances and the drive chain geometry cause the chain subassembly path length to vary as the carrier plates traverse the conveyor path. In one embodiment, the carrier plate support wheel 15 and chain drive wheel 16 have oversized holes at their centers to compensate for this. The chain drive wheel also has an oversized shoulder washer 21 at its center. These features allow horizontal movement without excessive wear due to contact of the chain drive wheel with the turn-around wheel center posts 43. Force provided by a tensioner 32 and motor drive wheel 30 on the carrier plate support wheel causes sufficient horizontal movement to maintain a slight tension on the drive chain subassembly at all times. In other embodiments, and additional tensioners and idler wheels engage the support wheel to provide the needed horizontal movement.

Thus; again referring to FIG. 3, the motors 29 drive the motor support wheels 15 which cause the chain drive wheels 16 to turn. The chain drive wheels 16 engage the drive chain drive subassembly 11 which pulls the carrier plate assemblies 1.

Figure 13:
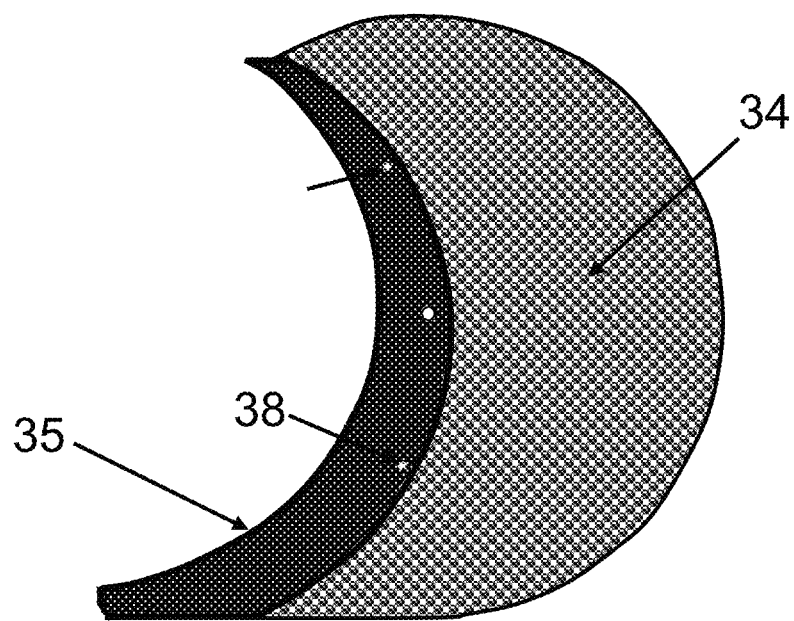
FIG. 13 is a plan view the load carrying top plate upper surface
Figure 14:
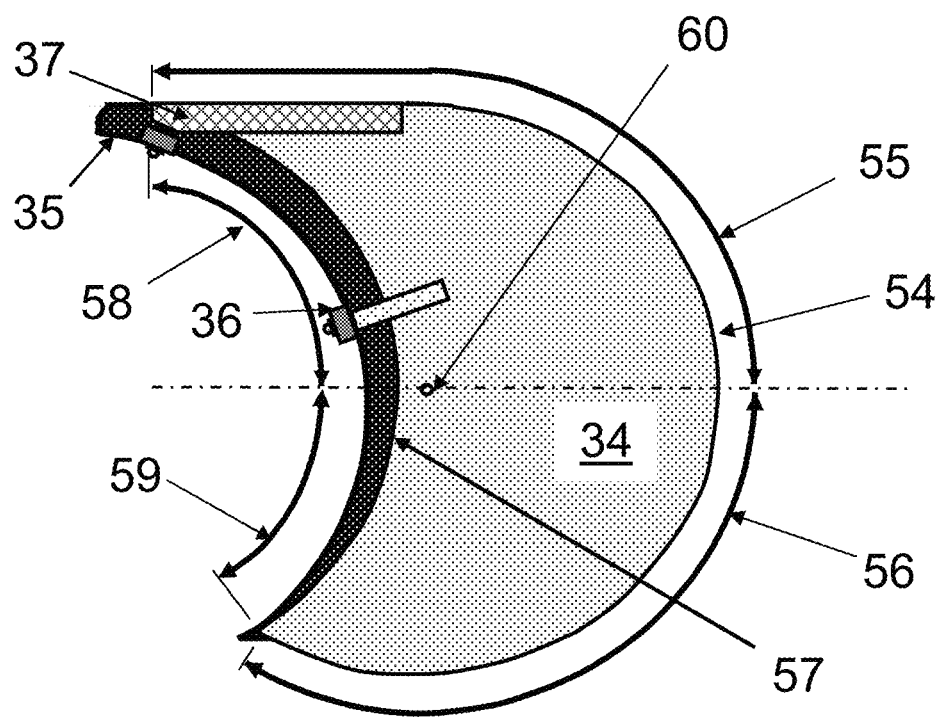
FIG. 14 is a plan view the under side of the load carrying top plate.

Carrier plate subassembly 1 construction is shown in FIG. 13 and FIG. 14. FIG. 13 shows the upper surface of the subassembly. FIG. 14 shows the underside of the subassembly. The carrier plate subassembly consists of a carrier plate 34, a carrier plate center support 36, and a carrier plate runner or strut 37. The upper surface of the carrier plate 34 has a scratch resistant, low friction material such as that used on counter tops.

Each carrier plate 34 has a leading edge 54 and a trailing edge 57. The leading edge 54 has an outer edge portion 55 disposed to one side of the midpoint of the conveyor path and an inner portion 56 disposed to the other side of the midpoint of the conveyor path. The leading edge portion is longer than the inner portion. The trailing edge 57 has an outer edge portion 58 disposed to one side of the midpoint of the conveyor path and an inner portion 59 disposed to the other side of the midpoint of the conveyor path. The trailing edge has outer portion is longer than the inner portion 59. Plates are connected to the drive chain with an attachment stud 25 at a pivot point 60 that is positioned on the plate center line and forward of the trailing edge. The leading edge is a convex circumference of a circle about the pivot point. The trailing edge is a convex circumference of a circle about the pivot point of the next succeeding plate.

The circular convex leading edge of one carrier plate being nestingly accepted by the circular concave trailing edge of the adjacent plate and the outer portion of the edges being longer than the inner portions provides a surface between the inner and outer rails that is free of gaps of appreciable size. The pivot point being located forward of the trailing edge eliminates the need for a gap to accommodate the attachment stud and provides a gap between plates that does not substantially vary as the plates traverse the conveyor path. The relatively small gap variation allows the gap to be small without causing binding at various points along the conveyor path. The small gap accommodates carrying smaller objects without the need of a gap cover.

In one embodiment a gap plate 35 is connected to the trailing edge of each carrier plate to cover the small gap between adjacent carrier plates. In embodiments where the gap is not of concern, it can be eliminated. The cover is a thin, low friction, scratch resistant material with a shape that is narrow at the plate inner edge so that covers on adjacent plates do not contact each other as the plates traverse the short radius bend at the conveyor path ends. However, it is wide enough to cover the gap between adjacent plates in all positions around the conveyor path, to provide sufficient surface contact with the plate to enable attaching the cover to the plate with glue. In one embodiment, small, low friction pads 38 are provided to hold the carrier plate covers in place and provide low resistance to objects as they slide on the surface while traversing the circular ends of the conveyer. In other embodiments, these pads are not provided.

The carrier plate runners 37 provide support on the outer edge of the plates and raise the plates above the carrier plate support wheels 15 so that the drive chain segments 24 can pass under them. Friction is minimized by locating the runners such that they will contact only the outer-most portion of the wheel, thus minimizing the distance the plate must slide over the support wheel 15 surface. However, the runners need not be located at the outer edge of the carrier plate 34. Locating the runners closer to the plate center allows the support wheel diameter to be varied to accommodate different conveyor sizes and/or speeds.

FIG. 15 shows how carrier plate assemblies are interlocked such that weight on one carrier plate is spread to its neighboring carrier plate to form a continuous support surface that facilitates smooth travel over the rollers on the roller rail and a smooth load transition from the roller rails to the support wheels. A carrier plate center support 36 is mounted on the convex edge of each plate such that it provides support on the concave edge of the next succeeding plate. The runners 37 extend beyond the convex edge of each plate such that they too provide support on the concave edge of the next succeeding plate. The runners and center supports are equipped with rollers or a low friction surface to allow the carrier plates to rotate with minimum friction when traversing the circular ends of the conveyer. Rollers can be purchased or easily fabricated from unthreaded nylon spacers.

The runners and center supports can be made of wood, aluminum or other suitable material. The center supports 36 are small enough to not contact the carrier plate support wheel are and located so that they do not interfere with travelers 22. Runners have a low friction material on the surface that contacts the carrier plate support wheel.

Figure 16:
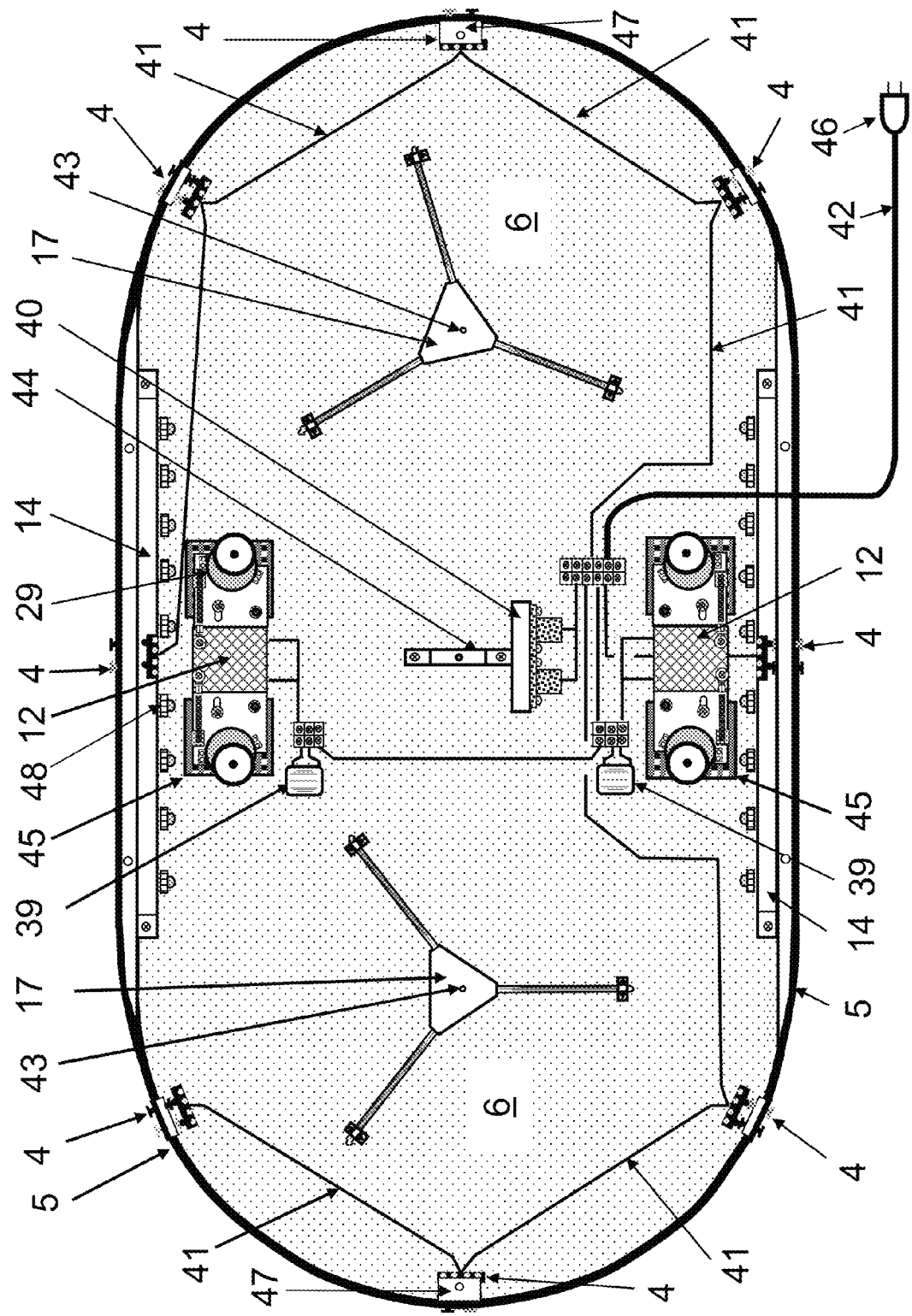
FIG. 16 is a plan view showing the tripod roller bearings, drive motor subassemblies, control cabling, and support mounted on the base.

In FIG. 16, the remaining carrier plate assemblies 1, drive chain subassembly 11, center support subassembly 18, and turn-around wheel subassembly 10, have been removed from FIG. 3. This reveals support and drive chain components that are mounted on the base 6. These are the sidewalls 5, the tripod roller bearings 17, motor starting capacitors 39, motor control relay subassembly 40, the control switch subassemblies 4, cabling 41, power cord 42, turn-around wheel center posts 43, and a center support block/center post subassembly 44. The base 6 consists of a platform that is made of wood, molded plastic or other flat, rigid, material. It is cut in an oval shape that is slightly larger than the travel path of the support carrier plate assemblies. It's underside is provided with pads of felt of other soft material to prevent scratching the surface of the table or bench that the conveyor is sitting on. The base has openings 45 at motor mount locations. The motor body is partially recessed into the openings such that the height of the motor shaft (which drives the height of the entire device) is minimized. The openings also provide heat removal. Motor covers 49 are provided on the bottom to prevent users from contacting the motors.

The sidewalls 5 provide support for the outer rail 3 and prevent access to mechanical and electrical components. They are attached to the base 6 with screws, wooden pegs, glue or other suitable fastening device. In the FIG. 1 embodiment, the control switch subassemblies 4 are installed in the sidewalls. In other embodiments, switches are installed at multiple locations on the perimeter of the table or bench which houses the conveyor. In still other embodiments, switches are located remotely from the conveyor and electrical connection provided by a suitable cable tether or wireless transmitter and receiver equipment.

The turn-around wheel center support posts 43 maintain the turn-around wheels in their proper horizontal location and provide attachment points for the inner rail. The support block/center post subassembly 44 provides vertical support for the center support plate 13, maintains the support plate in its proper horizontal location, and provides an attachment point for the inner rail.

The power plug 46, power cord 42, cabling 41, motor control subassembly 40, and control switch subassemblies 4 initiate motion on a first come, first serve basis.

Figure 17A:
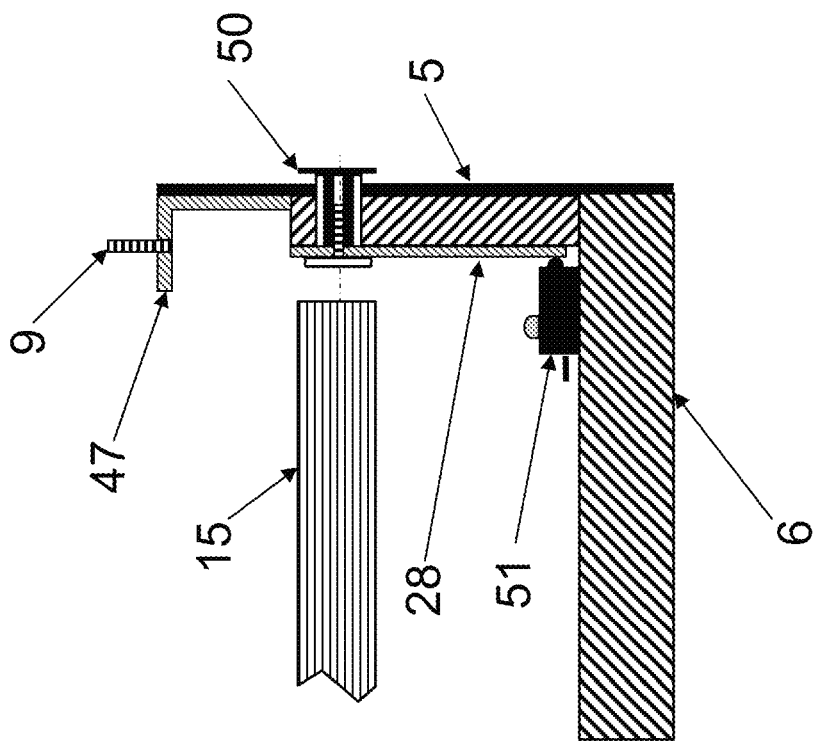
FIG. 17A is a section view along line 17-17 of FIG. 3 showing control switches mounted on a mounting block
Figure 17:
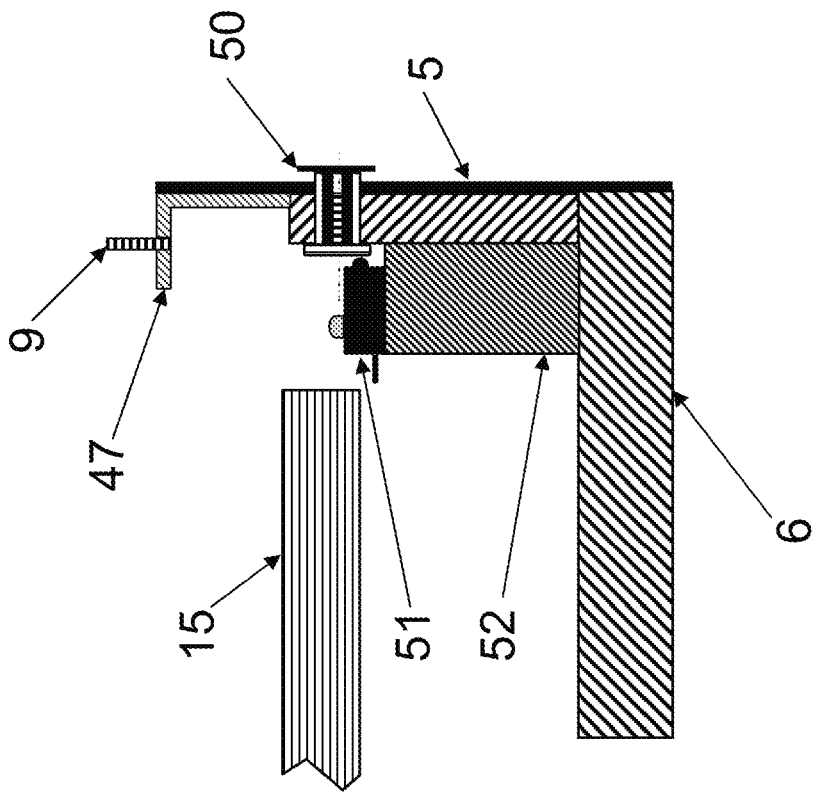
FIG. 17 is a section view along line 17-17 of FIG. 3 showing control switches mounted directly on the base

The control switch subassemblies are comprised of two pushbuttons 50 and control switches 51 as shown in FIG. 17. One pushbutton and control switch controls clockwise motion and one controls counter clockwise motion. Pushbuttons are plunger shaped devices made of wood, aluminum, plastic or other suitable material and are mounted in the side walls such that they can move longitudinally to actuate the control switches. The control switches are momentary switches with at least one set of normally open contacts. Pushbuttons are pressed to actuate the control switch. Switches have a depression force sufficient to return the pushbutton to its original position upon release.

The control switches are mounted on the base 6. In one embodiment, the switches are mounted on a mounting block 52 that locates the switch plunger at the height of the pushbutton. See FIG. 17. In other embodiments, control switches are mounted directly on the base and an activation slat 28 is provided to transfer the motion to the control switch plunger. See FIG. 17A. The embodiment using the switch blocks is easier to fabricate and install but requires that the support wheel diameter be smaller to provide room for the switch and its mounting block.

Figure 18:
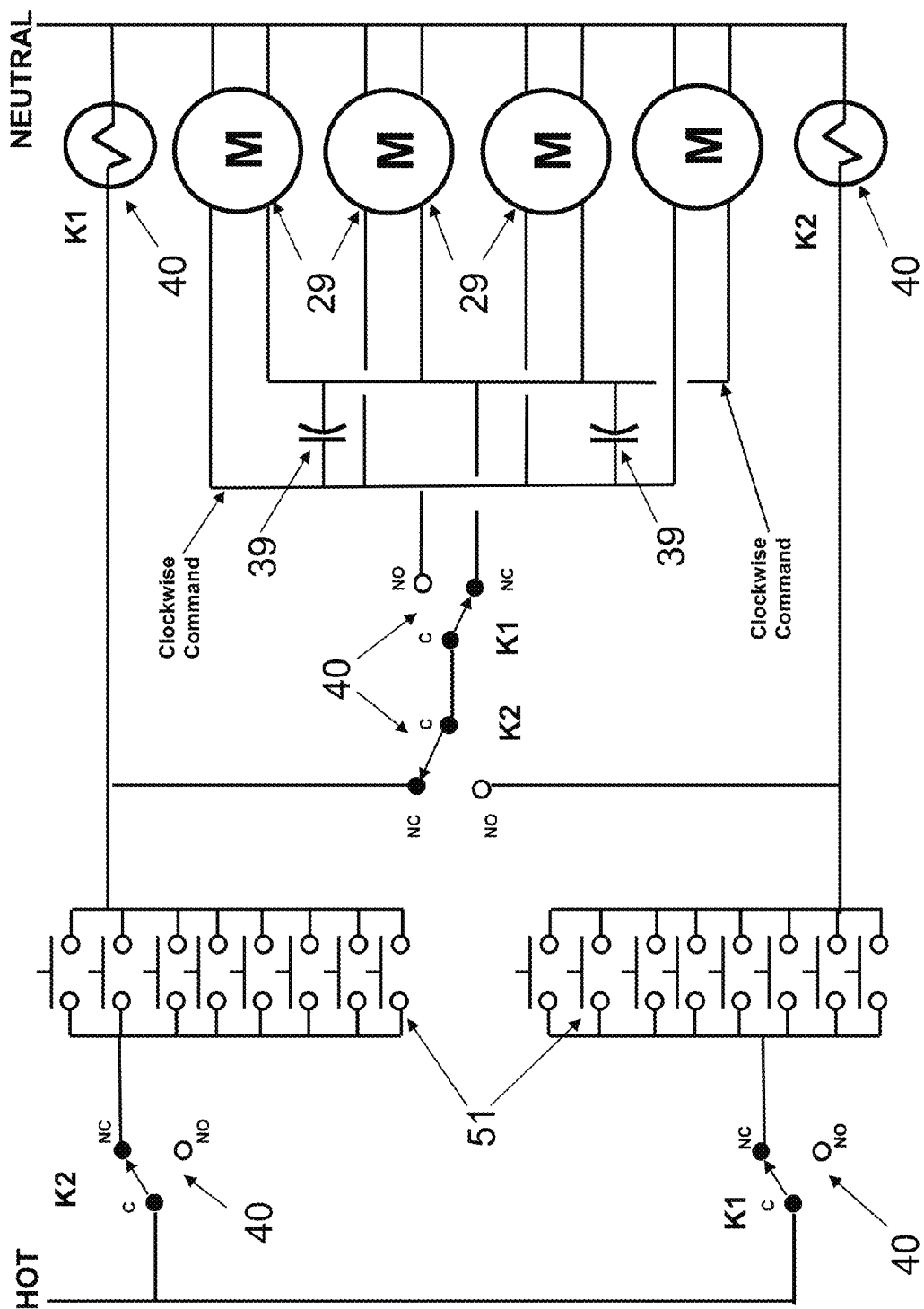
FIG. 18 is a schematic logic diagram showing the control circuit operation.

A schematic, logic diagram of the control circuit is shown in FIG. 18. When a control switch subassembly control switch 51 is activated, all other switches are rendered inactive until the activated switch is released. Thus activating two switches simultaneously cannot cause motor damage by issuing clockwise and counter-clock wise commands to the motors simultaneously.

Motors and the normally open contacts of the control switches 51 are wired in parallel so that as many or as few as needed can be provided. The motor control relay subassembly 40 consists of two double pole, double throw (DPDT) relays. Starting capacitors 39 have a capacitance that is recommended by the motor manufacturer. Standard terminal strips and quick disconnect lugs enable easy cabling installation.

In one embodiment, control switch subassemblies 4 are momentary action switches. Switches are activated to start motion and released to stop motion. In other embodiments, one standard on-off switch is wired in parallel with and/or substituted for momentary switches to provide continuous motion until action is taken to move the on-off switch to the off position.

In one embodiment, all electrical components are suitable for 120 VAC power normally provided in homes and commercial facilities. Other embodiments use components that operate at other voltages. However, these embodiments require corresponding power supplies which reduce reliability and make circuit fabrication more difficult. Since no electrical components are accessible without disassembly of the device, electrical safety is easily provided.

The previous description was generated by essentially showing how the device would be disassembled. Assembly is readily performed by reversing the process. First fabricate the base 6 and attach the roller rail 14, walls 5, center posts 43, support block 44, motor subassemblies 12, and the motor control relay subassembly 40 to it. Then install the control switch subassemblies 4 in the walls, and install the cabling 41, power cord 42 and power plug 46, and the tripod roller bearings 17. At this point the device will look like FIG. 16. Next install the turn-around wheels 10, the center support subassembly 13, and the drive chain subassembly 11. At this point the device will look like FIG. 3 with no carrier plate assemblies installed. Lastly, install the carrier plate assemblies 1, the inner rail 2, and outer rail 3 to make the unit appear as in FIG. 1 and FIG. 2.

Operation—FIGS. 1 and 2

Place the table top embodiment of FIG. 1 on a suitable table or bench. Place the table integrated embodiment of FIG. 2 at the desired location. Insert the power plug into a standard, 120

VAC, power outlet. Place articles of any shape at any location on the crescent shaped carrier plate assemblies 1. Press and hold the pushbutton of one of the clockwise control switch subassemblies 4 to start and maintain clockwise motion. The inner and outer rails will guide the articles around the conveyor path. At this point pressing other switches will have no effect. When the articles are at the desired location, release the pushbutton to stop motion. Press and hold the pushbutton of one of the counter clockwise control switch subassemblies 4 to start and maintain counter clockwise motion. The inner and outer rails will guide the articles around the conveyor path. At this point pressing other switches will have no effect. When the articles are at the desired location, release the pushbutton to stop motion.

CONCLUSION, RAMIFICATIONS, AND SCOPE

It follows from the foregoing that a conveyor system has been described which includes a train of carrier plates which collectively provide a support surface upon which an item to be conveyed can be placed and an endless drive member to which each carrier plate in the train is connected and which defines a conveyor path along which the item to be conveyed is moved by the system. Furthermore, the conveyor path includes either rightward-turning sections or leftward-turning sections, and each carrier plate is pivotally connected to the endless drive member to permit a pivotal adjustment of the carrier plate relative to the endless drive member in either a rightward or leftward direction as the train of carrier places is moved through the rightward-turning or leftward-turning sections of the conveyor path.

The improvement is characterized in that each carrier plate defines a leading edge which is directed substantially forwardly of the conveyor path when the train of carrier plates is moved along the conveyor path, and an opposite trailing edge. Furthermore, each of the leading and trailing edges has a outer portion which is disposed adjacent a side of the carrier plate opposite the direction of turn of the rightward-turning or leftward-turning sections of the conveyor path and an inner edge portion which is disposed adjacent a side of the carrier plate corresponding to the direction of turn of the rightwardly-turning or leftwardly-turning sections of the conveyor path. Still further, the leading and trailing edges of each carrier plate is shaped so that the trailing edge of a first of two sequential carrier plates in the train is accepted or received by the leading edge of a second of the two sequential carrier plates in the train, and each carrier plate is pivotally mounted to the endless drive member at a location along the plate which is disposed between the leading and trailing edges of the plate. In addition, each carrier plate is shaped so that the outer portion of each of its leading and trailing edges is longer than the inner portion of its leading and trailing edges so that as two sequential conveyor plates in the train are moved through the rightward-turning sections or leftward-turning sections of the conveyor path, the trailing edge of the first plate of the two sequential carrier plates is maintained in relatively close proximity to the leading edge of the second plate of the sequential carrier plates.

By way of example, exemplary dimensions of a conveyor system which incorporates the features of the FIG. 1 embodiment are provided here as follows: overall length of about 48¼ (48.250) inches, overall width of 26 inches, height of 3 inches, conveyor train width of about 10½ (10.500) inches, each plate is crescent shaped and has a radius of 6 inches, an overall leading edge length of 27⅜ (27.375) inches, wherein the length of the outer edge portion is 14¾ (14.750) inches, and the length of the inner edge portion is 12⅝ (12.625) inches, an overall trailing edge length of 27⅜ (27.375) inches, wherein the length of the outer edge portion is 8¼ (8.250) inches, and the length of the inner edge portion is 6⅛ (6.125) inches, and a pivot point ⅜ (0.375) inches forward of the trailing edge. It has been found that an embodiment possessing the aforementioned dimensional characteristics will provide a gap width between leftward (or rightward) plates of no more than ¹⁄₁₆ (0.0625) inches.

It will be understood that numerous modifications and substitutions can be had to the aforedescribed embodiment without departing from the spirit of the invention. For example, although the aforedescribed embodiment has been shown and described as including a leftward-turning train of carrier plates, an alternative embodiment of the invention can include a train of carrier plates adapted to turn in only rightward directions. Accordingly, the aforedescribed embodiment is intended for the purpose of illustration and not as limitation. Thus the scope of the embodiments should be determined by the appended claims and their legal equivalents, rather than by the examples given.

I claim:

1. In a conveyor system having a train of carrier plates which collectively provide a support surface upon which an item to be conveyed can be placed and an endless drive member to which each carrier plate in the train is connected and which defines a conveyor path along which the item to be conveyed is moved by the system wherein the conveyor path includes either rightward-turning sections or leftward-turning sections but not both rightward-turning and leftward-turning sections, and wherein each carrier plate is pivotally connected to the endless drive member to permit a pivotal adjustment of the carrier plate relative to the endless drive member in either a rightward or leftward direction as the train of carrier places is moved through the rightward-turning or leftward-turning sections of the conveyor path, the improvement characterized in that:

each carrier plate defines a leading edge which is directed substantially forwardly of the conveyor path when the train of carrier plates is moved along the conveyor path, an opposite trailing edge, and each of the leading and trailing edges has a outer portion which is disposed adjacent a side of the carrier plate opposite the direction of turn of the rightward-turning or leftward-turning sections of the conveyor path and an inner portion which is disposed adjacent a side of the carrier plate corresponding to the direction of turn of the rightwardly-turning or leftwardly-turning sections of the conveyor path, and the leading and trailing edges of each carrier plate is shaped so that the trailing edge of a first of two sequential carrier plates in the train is accepted or received by the leading edge of a second of the two sequential carrier plates in the train; and each carrier plate is pivotally mounted to the endless drive member at a location upon the plate which is disposed between the leading and trailing edges of the plate yet closer to the trailing edge than to the leading edge, and each carrier plate is shaped so that the outer portion its leading edge is longer than the inner portion of its leading edge and so that the outer portion of its trailing edge is longer than the inner portion of trailing edge so as to provide the carrier plate with an asymmetric shape with respect to an imaginary line directed along the conveyor path and through the location at which the plate is pivotally mounted to the endless drive member and to thereby permit the train of carrier plates to be moved through a rightward-turning section or a leftward-turning section of relatively small radius and to ensure that the area of the support surface located substantially between the outer portion of the leading edge and the outer portion of the trailing edge is larger than the area of the support surface located substantially between the inner portion of the leading edge and the inner portion of the trailing edge, and so that as two sequential conveyor plates in the train are moved through the turn of a rightward-turning section or a leftward-turning section of the conveyor path, the trailing edge of the first plate of the two sequential carrier plates and the leading edge of the second plate of the sequential carrier plates are maintained in relatively close proximity to one another; and each carrier plate is shaped so that the outer portion of its leading edge is devoid of any bend which opens away from the direction of turn along the conveyor path to prevent an appreciable gap from forming between the trailing edge of the first plate and the leading edge of the second plate of the two sequential carrier plates along the side of the conveyor path opposite the direction of turn when the two sequential carrier plates are moved through a rightward-turning section or a leftward-turning section of the conveyor path and so that the inner portion of its leading edge is devoid of any linear section along the length of the leading edge to prevent a sizeable gap from forming between the trailing edge of the first plate and leading edge of the second plate of the two sequential carrier plates along the side of the conveyor path corresponding with the direction of turn when the two sequential carrier plates are moved through a rightward-turning section or a leftward-turning section of the conveyor path.

2. The improvement as defined in claim 1 further comprising a series of gap plates associated with the train of carrier plates wherein each gap plate of the series is attached to a corresponding carrier plate and includes a portion which overlaps a portion of an adjacent carrier plate so that as two sequential conveyor plates in the train are moved through the rightward-turning or leftward-turning sections of the conveyor path, any gap which is present between the trailing edge of the first plate of two sequential carrier plates and the leading edge of the second plate of the two sequential carrier plates is covered by a gap plate.

3. The improvement as defined in claim 1 wherein the trailing edge of each carrier plate is in the shape of a concave arc and the trailing edge of each carrier plate is in the shape of a convex arc so that the leading edge of the second plate in two sequential carrier plates in the train of plates is nestingly accepted by the trailing edge of the first carrier plate in the two sequential carrier plates in the train of plates.

4. The improvement as defined in claim 3 further comprising a series of gap plates associated with the train of carrier plates wherein each gap plate of the series is attached to a corresponding carrier plate and includes a portion which overlaps a portion of an adjacent carrier plate so that as two sequential conveyor plates in the train are moved through the rightward-turning or leftward-turning sections of the conveyor path, any gap which is present between the trailing edge of the first plate of two sequential carrier plates and the leading edge of the second plate of the two sequential carrier plates is covered by a gap plate.

5. The improvement as defined in claim 4 wherein each gap plate is attached to a corresponding carrier plate adjacent the trailing edge thereof so that the portion of the second carrier plate of two sequential carrier plates in the train being overlapped by the overlapping portion of the gap plate is disposed adjacent the leading edge of the second carrier plate.

6. The improvement as defined in claim 4 further comprising a series of support struts associated with the train of carrier plates wherein each support strut is attached to a corresponding carrier plate and includes a portion which underlies a portion of an adjacent carrier plate so that weight borne by each carrier plate in the train is shared with an adjacent carrier plate by way of the support strut.

7. The improvement as defined in claim 6 wherein the first and second carrier plates of two sequential carrier plates are adapted to move rightwardly or leftwardly with respect to one another when the two sequential carrier plates are moved through the rightward-turning or leftward-turning sections of the conveyor path and the improvement further comprises a roller which is mounted upon each support strut for rotation with respect thereto and for rollably engaging the portion of the adjacent carrier underlain by the support strut to facilitate the relative movement between the two sequential carrier plates when the two sequential carrier plates are moved through the rightward-turning or leftward-turning sections of the conveyor path.

8. In a conveyor system having a train of carrier plates which collectively provide a support surface upon which an item to be conveyed can be placed and an endless drive member to which each carrier plate in the train is connected and which defines a conveyor path along which the item to be conveyed is moved by the system wherein the conveyor path includes either rightward-turning sections or leftward-turning sections, and wherein each carrier plate is pivotally connected to the endless drive member to permit a pivotal adjustment of the carrier plate relative to the endless drive member in either a rightward or leftward direction as the train of carrier places is moved through the rightward-turning or leftward-turning sections of the conveyor path, the improvement characterized in that:

each carrier plate defines a leading edge which is directed substantially forwardly of the conveyor path when the train of carrier plates is moved along the conveyor path, an opposite trailing edge; and each carrier plate is pivotally mounted to the endless drive member at a location along the plate which is disposed between the leading and trailing edges of the plate, and each carrier plate is shaped so that as two sequential conveyor plates in the train are moved through the rightward-turning sections or leftward-turning sections of the conveyor path, the trailing edge of the first plates of the two sequential carrier plates is moved toward and away from the leading edge of the second plate of the sequential carrier plates by a relatively small amount; and a series of gap plates associated with the train of carrier plates wherein each gap plate of the series is attached to a corresponding carrier plate and includes a portion which overlaps a portion of an adjacent carrier plate so that as two sequential conveyor plates in the train are moved through the rightward-turning or leftward-turning sections of the conveyor path, any spaced distance which is present between the trailing edge of the first plate of two sequential carrier plates and the leading edge of the second plate of the two sequential carrier plates is covered by the overlapping portion of a gap plate.

9. The improvement as defined in claim 8 wherein the trailing edge of each carrier plate is in the shape of a concave arc and the trailing edge of each carrier plate is in the shape of a convex arc so that the leading edge of the second plate in two sequential carrier plates in the train of plates is nestingly accepted by the trailing edge of the first carrier plate in the two sequential carrier plates in the train of plates.

10. The improvement as defined in claim 9 further comprising a series of support struts associated with the train of carrier plates wherein each support strut is attached to a corresponding carrier plate and includes a portion which underlies a portion of an adjacent carrier plate so that weight borne by each carrier plate in the train is shared with an adjacent carrier plate by way of the support strut.

11. The improvement as defined in claim 10 wherein the first and second carrier plates of two sequential carrier plates are adapted to move rightwardly or leftwardly with respect to one another when the two sequential carrier plates are moved through the rightward-turning or leftward-turning sections of the conveyor path and the improvement further comprises a roller which is mounted upon each support strut for rotation with respect thereto and for rollably engaging the portion of the adjacent carrier underlain by the support strut to facilitate the relative movement between the two sequential carrier plates when the two sequential carrier plates are moved through the rightward-turning or leftward-turning sections of the conveyor path.

12. A conveyor system for conveying an item along a conveyor path, said conveyor system comprising:
a base;
spaced-apart wheels which are mounted upon the base for rotation about substantially parallel and vertical axes and wherein each of the wheels defines a circumference;
an endless drive member which is positioned about the circumference of the spaced-apart wheels so that rotation of one of the wheels about its rotation axis effects the rotation of the other of the wheels about its rotation axis and wherein the path along which the endless drive member extends substantially corresponds with the conveyor path along which an item is to be conveyed and wherein the conveyor path includes either rightward-turning sections or leftward-turning sections, but not both rightwardly-turning and leftwardly-turning sections;
a train of carrier plates which are connected to the endless drive member for movement therewith about the spaced-apart wheels wherein the carrier plates collectively provide a substantially upwardly-facing support surface upon which an item to be conveyed can be positioned and each carrier plate defines a leading edge which is directed substantially forwardly of the conveyor path when the train of carrier plates is moved along the conveyor path, an opposite trailing edge, and each of the leading and trailing edges has a outer portion which is disposed adjacent a side of the carrier plate opposite the direction of turn of the rightward-turning or leftward-turning sections of the conveyor path and an inner edge portion which is disposed adjacent a side of the carrier plate corresponding to the direction of turn of the rightwardly-turning or leftwardly-turning sections of the conveyor path, and the leading and trailing edges of each carrier plate is shaped so that the trailing edge of a first of two sequential carrier plates in the train is accepted or received by the leading edge of a second of the two sequential carrier plates in the train; and
each carrier plate is pivotally mounted to the endless drive member at a location on the plate which is disposed between the leading and trailing edges of the plate, and each carrier plate is shaped so that the outer portion of its leading edge is longer than the inner portion of its leading edge and so that the outer portion of its trailing edge is longer than the inner portion of its trailing edge so as to provide the carrier plate with an asymmetric shape with respect to an imaginary line directed along the conveyor path and through the location at which the plate is pivotally mounted to the endless drive member and to thereby permit the train of carrier plates to be moved through a rightward-turning section or a leftward-turning section of relatively small radius and to ensure that the area of the support surface located substantially between the outer portion of the leading edge and the outer portion of the trailing edge is larger than the area of the support surface located substantially between the inner portion of the leading edge and the inner portion of the trailing edge, and so that as two sequential conveyor plates in the train are moved through the turn of a rightward-turning section or a leftward-turning section of the conveyor path, the trailing edge of the first plate of the two sequential carrier plates is maintained in relatively close proximity to the leading edge of the second plate of the sequential carrier plates; and
each carrier plate is shaped so that the outer portion of its leading edge is devoid of any bend which opens away from the direction of turn along the conveyor path to prevent an appreciable gap from forming between the trailing edge of the first plate and the leading edge of the second plate of the two sequential carrier plates along the side of the conveyor path opposite the direction of turn when the two sequential carrier plates are moved through a rightward-turning section or a leftward-turning section of the conveyor path and so that the inner portion of its leading edge is devoid of any linear section along the length of the leading edge to prevent a sizeable gap from forming between the trailing edge of the first plate and leading edge of the second plate of the two sequential carrier plates along the side of the conveyor path corresponding with the direction of turn when the two sequential carrier plates are moved through a rightward-turning section or a leftward-turning section of the conveyor path.

13. The conveyor system as defined in claim 12 further comprising a series of gap plates associated with the train of carrier plates wherein each gap plate of the series is attached to a corresponding carrier plate and includes a portion which overlaps a portion of an adjacent carrier plate so that as two sequential conveyor plates in the train are moved through the rightward-turning or leftward-turning sections of the conveyor path, any gap which is present between the trailing edge of the first plate of two sequential carrier plates and the leading edge of the second plate of the two sequential carrier plates is covered by a gap plate.

14. The conveyor system as defined in claim 12 wherein the trailing edge of each carrier plate is in the shape of a concave arc and the trailing edge of each carrier plate is in the shape of a convex arc so that the leading edge of the second plate in two sequential carrier plates in the train of plates is nestingly accepted by the trailing edge of the first carrier plate in the two sequential carrier plates in the train of plates.

15. The conveyor system as defined in claim 14 further comprising a series of gap plates associated with the train of carrier plates wherein each gap plate of the series is attached to a corresponding carrier plate and includes a portion which overlaps a portion of an adjacent carrier plate so that as two sequential conveyor plates in the train are moved through the rightward-turning or leftward-turning sections of the conveyor path, any gap which is present between the trailing edge of the first plate of two sequential carrier plates and the leading edge of the second plate of the two sequential carrier plates is covered by the overlapping portion of a gap plate.

16. The conveyor system as defined in claim 15 wherein each gap plate is attached to a corresponding carrier plate adjacent the trailing edge thereof so that the portion of the second carrier plate of two sequential carrier plates in the train being overlapped by the overlapping portion of the gap plate is disposed adjacent the leading edge of the second carrier plates.

17. The conveyor system as defined in claim 16 further comprising a series of support struts associated with the train of carrier plates wherein each support strut is attached to a corresponding carrier plate and includes a portion which underlies a portion of an adjacent carrier plate so that weight borne by each carrier plate in the train is shared with an adjacent carrier plate by way of the support strut.

18. The conveyor system as defined in claim 16 wherein the first and second carrier plates of two sequential carrier plates are adapted to move rightwardly or leftwardly with respect to one another when the two sequential carrier plates are moved through the rightward-turning or the leftward-turning sections of the conveyor path and the improvement further comprises a roller which is mounted upon each support strut for rotation with respect thereto and for rollably engaging the portion of the adjacent carrier underlain by the support strut to facilitate the relative movement between the two sequential carrier plates.

19. The conveyor system as defined in claim 12 further comprising a motor which is connected in driving relationship with one of the wheels for driving the one wheel about its rotation axis and thereby effect the movement of the train of carrier plates along the conveyor path.

\* \* \* \* \*